United States Patent [19]

Tajika et al.

[11] Patent Number: 5,142,374
[45] Date of Patent: Aug. 25, 1992

[54] IMAGE RECORDING METHOD AND APPARATUS THEREFOR

[75] Inventors: Hiroshi Tajika; Noribumi Koitabashi; Atsushi Arai; Hiromitsu Hirabayashi, all of Yokohama, Japan

[73] Assignee: Canon Kabushiki Kaisha, Tokyo, Japan

[21] Appl. No.: 531,312

[22] Filed: May 31, 1990

[30] Foreign Application Priority Data

Jun. 1, 1989 [JP] Japan .................................. 1-137419

[51] Int. Cl.$^5$ ...................... H04N 1/034; H04N 1/40; B41J 2/205; B41J 2/21
[52] U.S. Cl. ..................................... 358/298; 358/75; 346/140 R
[58] Field of Search ........................... 346/1.1, 140 R; 358/298, 75, 456, 457, 458, 459, 466

[56] References Cited

U.S. PATENT DOCUMENTS

| 4,449,150 | 5/1984 | Kato ..................................... 358/456 |
| 4,511,907 | 4/1985 | Fukuchi ............................... 346/46 |
| 4,560,997 | 12/1985 | Sato et al. ......................... 346/140 R |
| 4,604,654 | 8/1986 | Sakurada et al. ................... 358/298 |
| 4,631,578 | 12/1986 | Sasaki et al. ......................... 358/298 |
| 4,635,078 | 1/1987 | Sakurada et al. ................... 346/140 R |
| 4,672,432 | 6/1987 | Sakurada et al. ..................... 358/75 |
| 4,682,216 | 7/1987 | Sasaki et al. ......................... 358/75 |
| 4,686,538 | 8/1987 | Kouzato ............................... 346/1.1 |
| 4,692,773 | 9/1987 | Saito et al. ........................... 346/1.1 |
| 4,713,746 | 12/1987 | Watanabe et al. .................... 346/1.1 |
| 4,714,964 | 12/1987 | Sasaki .................................. 358/298 |
| 4,727,436 | 2/1988 | Kawamura et al. ................. 358/298 |
| 4,772,911 | 9/1988 | Sasaki et al. ..................... 346/140 R |
| 4,860,026 | 8/1989 | Matsumoto et al. ................. 346/1.1 |
| 4,952,942 | 8/1990 | Kanome et al. ..................... 346/1.1 |
| 4,959,659 | 9/1990 | Sasaki et al. ......................... 346/1.1 |

FOREIGN PATENT DOCUMENTS 0150119 7/1985 European Pat. Off. .
0304289 2/1989 European Pat. Off. .
3525011 1/1986 Fed. Rep. of Germany .

OTHER PUBLICATIONS

Stoffel, J. C. and Moreland, J.F., "A Survey of Electronic Techniques for Pictorial Image Reproduction", IEEE Trans. on Commun., vol. Com-29, No. 12, Dec. 1981.

Primary Examiner—Benjamin R. Fuller
Assistant Examiner—Scott A. Rogers
Attorney, Agent, or Firm—Fitzpatrick, Cella, Harper & Scinto

[57] ABSTRACT

In order to record an image having an excellent gradient by using inks of different densities, image data for dark ink and light ink are generated in accordance with the received image data. The generated data for dark ink is converted into a binary signal which is suitable for reproducing the resolution, while data for light ink is converted to another binary signal which is suitable for expressing gradient. In accordance with these binary signals, the discharge of each ink is controlled so as to record the image.

27 Claims, 10 Drawing Sheets

| 1 | 33 | 9 | 41 | 3 | 35 | 11 | 43 |
|---|---|---|---|---|---|---|---|
| 49 | 17 | 57 | 25 | 51 | 19 | 59 | 27 |
| 13 | 45 | 5 | 37 | 15 | 47 | 7 | 39 |
| 61 | 29 | 53 | 21 | 63 | 31 | 55 | 23 |
| 4 | 36 | 12 | 44 | 2 | 34 | 10 | 42 |
| 52 | 20 | 60 | 28 | 50 | 18 | 58 | 26 |
| 16 | 48 | 8 | 40 | 14 | 46 | 6 | 38 |
| 64 | 32 | 56 | 24 | 62 | 30 | 54 | 22 |

FIG. 2A

| 45 | 17 | 25 | 37 | 47 | 19 | 27 | 39 |
|---|---|---|---|---|---|---|---|
| 49 | 1 | 9 | 57 | 51 | 3 | 11 | 59 |
| 29 | 33 | 41 | 21 | 31 | 35 | 43 | 23 |
| 13 | 61 | 53 | 5 | 15 | 63 | 55 | 7 |
| 48 | 20 | 28 | 40 | 46 | 18 | 26 | 38 |
| 52 | 4 | 12 | 60 | 50 | 2 | 10 | 58 |
| 32 | 36 | 44 | 24 | 30 | 34 | 42 | 22 |
| 16 | 64 | 56 | 8 | 14 | 62 | 54 | 6 |

FIG. 2B

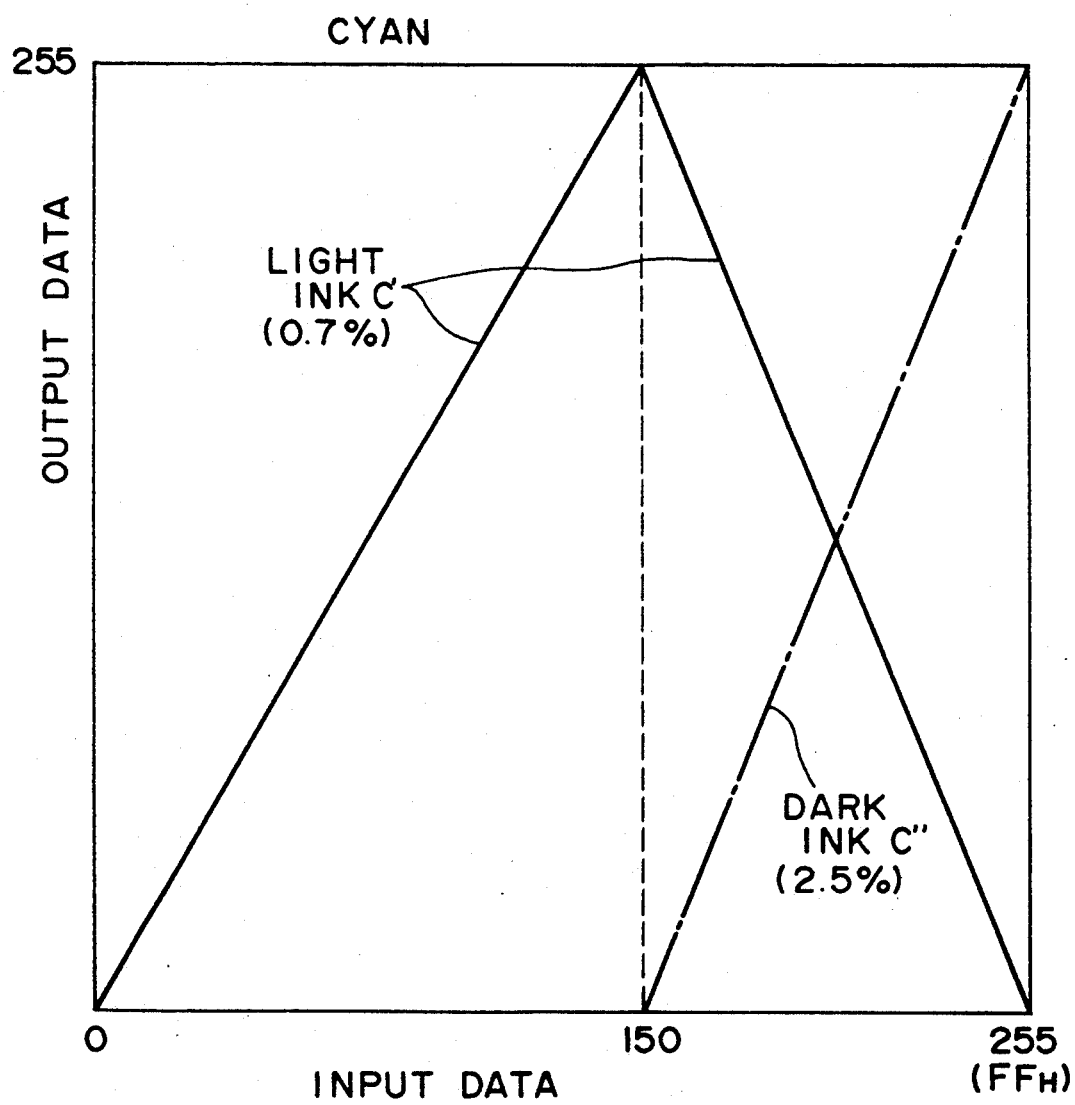
F I G. 3

IMAGE RECORDING METHOD AND APPARATUS THEREFOR

BACKGROUND OF THE INVENTION

The present invention relates to an image recording method and an apparatus therefor, for example, to an image recording method and an apparatus therefor for recording an image by using a recording head which discharges ink.

Hitherto, in an apparatus for reproducing a binary image by a digital processing, such as a copying machine, a printer, a facsimile or the like, the collapse of dots becomes excessive in highlight portions and a marked granular appearance of the dots cannot be avoided when an image such as a photograph, a print or a picture in which dark and light gradients are finely expressed is recorded.

However, the conventional image processing technology cannot sufficiently overcome the above-described problems. Accordingly, a dark/light multi-valued recording method in which both dark and light ink are employed in a liquid jetting recording apparatus (a so-called ink jet printer) has been disclosed in U.S. Pat. No. 4,672,432.

According to this dark/light multi-valued recording method, the gradient in the highlight portion can be improved, the granular appearance of the dots can be reduced and the image quality can thereby be improved simply by replacing the binary processing with trinary processing. The reason for this is that applying low density ink to the highlight portion can remove the noise due to a sole dot.

Each of the output signal levels after separation by a dark/light separation table is supplied to a binary circuit in which it is converted into an on/off recording signal. The binary circuits are arranged to have the same structure for both dark and light ink.

However, in the above-described recording method depending upon the dark/light multi-valued processing, there has been a limitation to quintriple value processing due to the quantity of ink to be applied. Furthermore, since the dots for the dark ink and light ink are arranged to have the same diameter and the same binary circuits are provided in the apparatus, the excessive granular appearance of the dots of the dark ink cannot be prevented if dark ink is applied to a region printed with light ink in the highlight portion.

Furthermore, in a color recording apparatus employing four color components C (cyan), M (magenta), Y (yellow) and K (black), the granular appearance of K and M cannot be prevented. In particular, the skin color region such as the face of a person displays an excessive granular appearance due to the masking and UCR (Under Color Removal) conditions in the image processing. The problems of the type described above also arise in the other types of recording apparatus in which toner or donor film for a thermal printer is employed.

SUMMARY OF THE INVENTION

Accordingly, an object of the present invention is to provide an image reproduction method from which an output image can be recorded in which a granular portion is removed and high resolution and high gradient are realized.

In order to achieve the above-described object, an image recording method according to the present invention is arranged such that high density dots are recorded by raising resolution with respect to that for the low density dots.

According to the present invention, there is provided an image recording method for recording a gradient image by combining dots of different densities, comprising: a process in which image data is received; a process in which data corresponding to dots of each density is generated in accordance with the value of the received image data; and a process in which data corresponding to the thus generated dots of each density is converted so as to have a resolution which corresponds to the dots of each density.

Another object of the present invention is to provide an image recording apparatus capable of recording an output image in which granular appearance can be prevented and which exhibits excellent resolution and gradient.

In order to achieve the above-described object, according to the present invention, there is provided an image recording apparatus for recording a gradient image by combining dots of different densities comprising: receiving means for receiving image data; data generating means for generating data which corresponds to the dots of each density in accordance with the value of the image data received by the receiving means; and conversion means for converting each data which corresponds to the dots of each density generated in the data generating means so as to have resolution which corresponds to the dots of each density.

According to the present invention, there is provided an image recording apparatus for recording a gradient image by combining dots of different densities, comprising: receiving means for receiving image data; data generating means for generating data which corresponds to the dots of each density in accordance with the value of the image data received; compensating means for compensating data which corresponds to the dots of each density generated in the data generating means in a proportion which is based upon the resolution of each of the densities; recording means for recording the image in accordance with the resolution for each of the densities; and control means for controlling in such a manner that data which corresponds to the dots of each density compensated by the compensating means is recorded by the recording means.

Another object of the present invention is to provide an images recording apparatus for recording image by discharging inks of different densities and which is capable of recording an output image without a granular appearance and exhibiting high resolution and gradient.

In order to achieve the above-described object, according to the present invention, there is provided an image recording apparatus for recording a gradient image by combining dots of at least two different densities, comprising: receiving means for receiving image data; first data generating means for generating image data for dark ink in accordance with the value of the image data received by the receiving means; second data generating means for generating image data for light ink in accordance with the value of the image data received by the receiving means; first conversion means for converting the image data for dark ink generated by the first data generating means into a binary signal with the resolution made critical; second conversion means for converting the image data for light ink generated by the second data generating means into a binary signal with the gradient made critical; and recording means for controlling the discharge of ink of each density in accordance with the binary signal converted by the first and second conversion means and recording the image.

According to the present invention, there is provided an image recording apparatus for recording a gradient image by combining dots having a plurality of different densities, comprising: receiving means for receiving image data; data generating means for generating image data which corresponds to ink of each density in accordance with the value of the image data received; compensating means for compensating image data generated by the data generating means in such a manner that image data for high density ink is subjected to higher compensation rate; conversion means for converting image data for each ink of each density compensated by the compensating means into a binary signal; recording means for recording ink in such a manner that the higher the density of the ink, the greater the resolution becomes; and control means for controlling in such a manner that the recording means performs the recording in accordance with the binary signal for each ink of each density converted by the conversion means.

Other and further objects, features and advantages of the invention will be appear more fully from the following description.

BRIEF DESCRIPTION OF THE DRAWINGS

FIG. 2A illustrates a Bayer type dither matrix;

FIG. 2B illustrates a tone type dither matrix;

FIG. 3 illustrates the conversion characteristics of a dark/light separation table according to a first embodiment of the present invention;

DETAILED DESCRIPTION OF THE EMBODIMENTS

Preferred embodiments of the present invention will now be described in detail with reference to the drawings.

According to the embodiments, description will be made of a copying machine having a printing mechanism bubble jet printer. Since the principle of the bubble jet printer has been disclosed in U.S. Pat. No. 4,723,129, its description is omitted here. The structure of the bubble jet printer according to the embodiments of the present invention has 8 recording heads therein. The recording heads are mounted on a carriage at predetermined intervals, the carriage performing the main scanning operation. Furthermore, each of the 8 recording heads has a predetermined number of nozzles in the sub-scanning direction.

As for record writing ink, each of recording color components C (cyan), M (magenta), Y (yellow) and K (black) is arranged to have dark tone and light tone.

Figure 1:
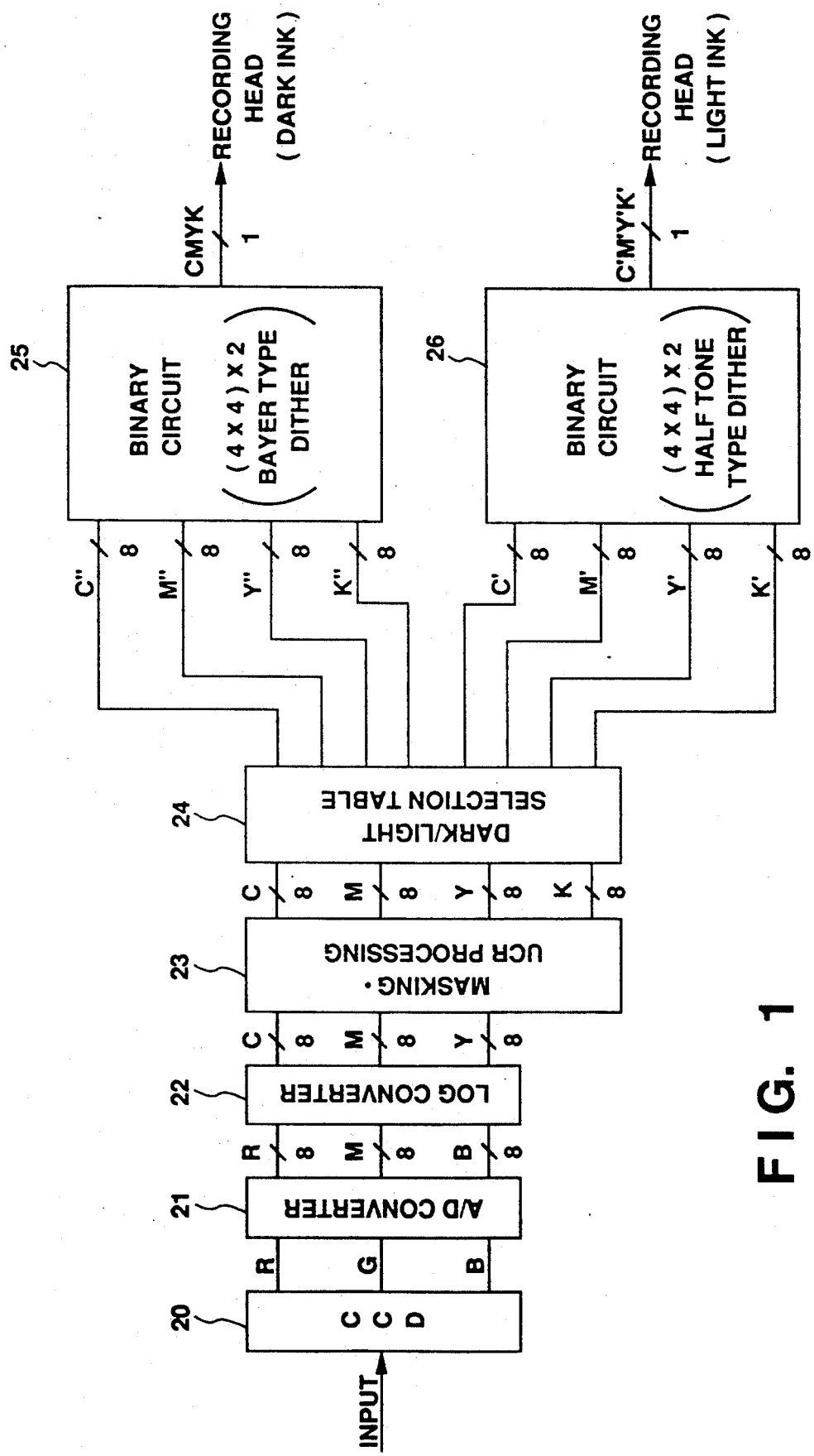
FIG. 1 is a block diagram which illustrates an image processing system according to a first embodiment of the present invention.

FIG. 1 is a circuit diagram for processing an image performed in a copying machine according to this embodiment.

Reflected light, obtained by applying halogen light or the like to a document placed on a document plate (omitted from illustration), is received by a CCD 20 which is a sensor for each of the color components via a rod lens array. The CCD 20 outputs analog data for each of the color components R (Red), G (Green) and B (Blue). Data for each of the color components is held in a sample hold circuit for a predetermined time. Each of the voltage levels thus held is, by an A/D converter 21, converted into 8-bit digital data. Then, each of data is logarithmically converted into C, M and Y data (8 bits respectively) by a log converter 22. Then, thus obtained 8-bit C, M and Y data is subjected to a masking and a basic color removal in a masking/UCR processing portion 23 so that colors C, M, Y and K (8 bits) are obtained.

Although the signal is processed as described above, other types of general image processing procedures can be employed in the present invention.

Data for colors C, M, Y and K are fetched by a dark/light separation table 24 disposed next to the masking/UCR processing portion 23. The dark/light separation table 24 receives, for example, data for color C and outputs data C' (8 bits) for light ink and data C'' for dark ink after dividing the data for color C. Data for the other color components are similarly outputted after being divided into data for dark ink and light ink. The dark/light separation table 24 is a so-called "Look-up" table and its detailed operation will be discussed later.

Data for light ink (C', M', Y' and K') outputted from the separation table 24 are distributed to a binary circuit 26, while data for dark ink (C'', M'', Y'' and K'') are distributed to another binary circuit 25.

The binary circuit 25 binarizes supplied dark ink data Y'', M'', C'' and K'' for one pixel by its Bayer type binary matrix pattern having a structure (4×4)=2 as shown in FIG. 2A. The above-described Bayer type binary matrix pattern is one type of binary matrix patterns exhibiting an excellent resolution based on the organizational dither method. Similarly, the binary circuit 26 binarizes supplied light ink data Y', M', C' and K' by its half tone binary matrix pattern having a structure (4×4)×2 as shown in FIG. 2B. The half tone binary matrix pattern is one type of binary matrix pattern exhibiting excellent gradient expression capability based on the organizational dither method. Then, each of data is outputted in the form of data (a one bit signal) for turning a recording head on or off.

Since the recording head for dark ink and that for light ink are disposed away from each other and the recording heads for each of the color components are also disposed away from each other, recording head on/off data output from the binary circuits 25 and 26 are synchronized with one another by a delaying buffer (omitted from illustration).

The method of making the dark/light separation table 24 will now be described.

First, 17×17 patches are formed by combining dark and light ink in such a manner that the quantity of the dark ink is classified into 0 to 16 degrees to which 0 to 16 degrees of light ink are added respectively. That is patches of the type in which light ink is changed with respect to the quantity degree "0" of the dark ink are prepared. Furthermore, patches corresponding to other dark ink quantity degrees "1 to 16" are prepared. Then, each of the batches is colorimetrically analyzed by using a "Color Analyzer CA-35" manufactured by Murakami Shikisaisha.

Thus, the obtained density data is plotted as the change of data for light ink with the dark ink fixed so that the relationship between the combination of the dark and the light ink and the density is obtained. According to this embodiment, the combination of data for the dark and light ink was obtained and allowed a linear relationship to be established between the sole color input data and the result of the colorimetrical analysis. The conversion graph of the dark/light separation table 24 thus obtained is shown in FIG. 3, where symbol C represents the separation characteristics with respect to cyan. The other color components are processed in a manner to the above-described process.

The separation of the cyan data C will now be specifically described.

That is, if the value of the 8-bit data C supplied from the masking/UCR processing portion 23 is in a range between 00 and 150, data C" for the dark ink is fixed to "0", while data C' for the light ink is output in the range between 0 and 255. If the supplied data is in a range between 150 and 255, the data C" for the dark ink is output in the range between 0 and 255, and the data C' for the light ink is output in range between 255 and 0.

Similar conversion tables are prepared for the other color components M, Y and K. As a result, the dark/light separation table 24 according to this embodiment includes 4 look-up tables having characteristics as shown in FIG. 3.

According to this embodiment, higher dye density ink is used when the input data represents high density with excellent resolution being maintained in the image produced by this recording technique.

As for the dye density of C-ink, 0.7%-light ink and 2.5% dark ink were employed. As for colors M, Y and K, the tables having the conversion characteristics which meet the corresponding characteristics of the colors were employed. However, the density of the dye in the dark ink and the light ink for each of the color ink are as follows:

| | | |
|---|---|---|
| In the case of M: | light: 0.6% | dark: 2.5% |
| In the case of Y: | light: 0.7% | dark: 2.0% |
| In the case of K: | light: 1.0% | dark: 3.0% |

The recording order of the dark ink and the light ink was arranged as dark →light. And the recording order of the color components was arranged as C→M→Y→K so as to overlap successively. The present invention is not, however, limited to the above-described order and the dye density. The order may be changed in accordance with the type of the image to be outputted or the type of the dye employed. However, if the densities of the dye for the dark and the light ink are changed, the conversion characteristics of the dark/light separation table must, of course, be changed.

Then, color photograph (silver salt) images or half tone image (175 lines) were outputted, resulting in an excellent productionality obtained in the skin color portions and the thin lines portions of characters.

A second embodiment of the present invention will now be described.

According to the first embodiment, dark ink data and light ink data for each of the color components are received so as to be subjected to dither processing in the binary circuits 25 and 26. At this time, data for dark ink is binarized by the dither matrix patterns exhibiting an excellent resolution, while data for light ink is binarized by the dither matrix exhibiting excellent gradient expression capability.

However, the present invention is not limited to the above-described description. For example, a structure may be employed in which data for dark ink is binarized by the error diffusion method and data for light ink is binarized by the density pattern method.

Figure 4:
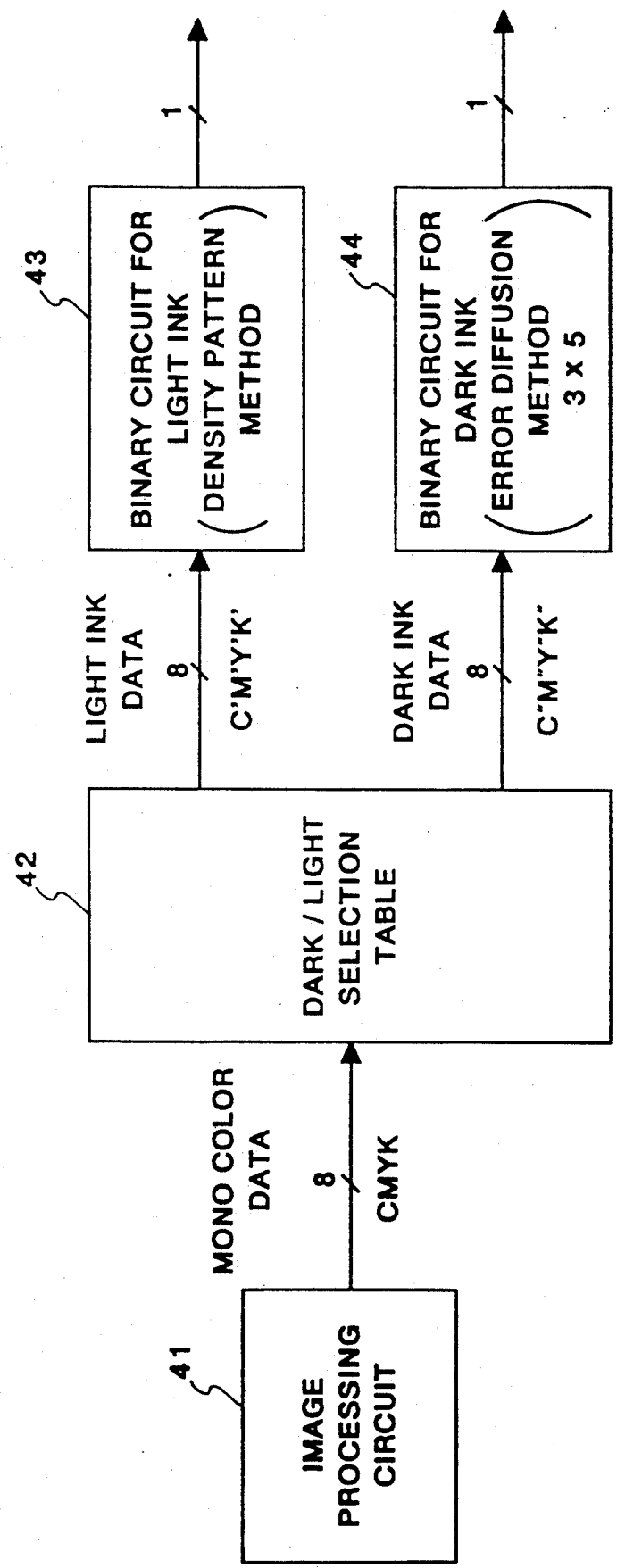
FIG. 4 is a block diagram which illustrates an image processing portion according to a second embodiment of the present invention.

FIG. 4 is a block diagram for use in the above-described case. Referring to the drawing, reference numeral 41 represents an image processing circuit including the CCD 20 to the masking/UCR processing portion 23 shown in FIG. 1. Reference numeral 42 represents a dark/light separation table which is the same as that represented by reference numeral 24 shown in FIG. 1. Reference numeral 43 represents a binary circuit acting on the basis of the density pattern method and 44 represents a binary circuit acting on the basis of the error diffusion method.

Figures 5, 6:
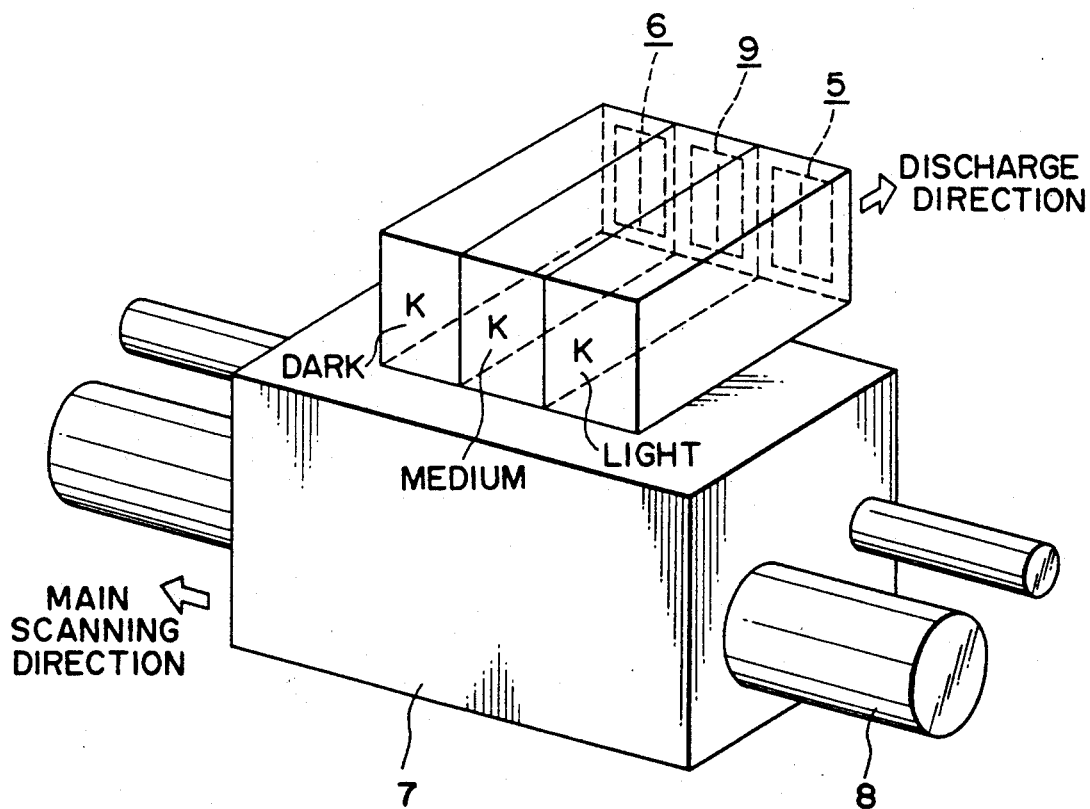
FIG. 5 illustrates the matrices for the error diffusion method according to the second embodiment of the present invention.
FIG. 6 illustrates a portion around a carriage in a printing portion according to a third embodiment of the present invention.

For example, a matrix shown in FIG. 5 is used in the above-described error diffusion method. Referring to the drawing, symbol "*" represents a subject pixel and the numerals in the matrices represent the diffusion coefficients. Since processing according to the density pattern method and the error diffusion method is well known, further description will be omitted here.

Then, a third embodiment of the present invention will now be described in which a monochrome image is reproduced.

According to the third embodiment of the present invention, a black ink quadruple recording is realized by arranging the types of the ink to be light ink (dye density: 0.5%), medium ink (dye density: 1.0%) and dark ink (dye density: 3.0%).

FIG. 6 is a perspective view which illustrates a cartridge of a type in which dark, medium and light ink cartridges are integrally provided.

Referring to the drawing, reference numeral 5 represents a light ink cartridge, 9 represents a medium ink cartridge and 6 represents a dark ink cartridge. The image can be formed when a carriage 7 on which the above-described three cartridges are moved in the main scanning direction as designated by the arrow shown in the drawing. Therefore, the ink applying order is arranged as: dark, medium and light.

The above-described apparatus is arranged in such a manner that the dark ink cartridge 6 is connected to a head displaying a recording density of 400 dpi, the medium ink cartridge 9 is connected to that displaying a recording density of 300 dpi and the light ink cartridge 5 is connected to that displaying a recording density of 200 dpi. The recording side of the recording head of each of the cartridges 6, 9 and 5 has a plurality of ink discharging ports (nozzles) arranged vertically to form a line. The ratio of the number of nozzles in the recording head for the light ink, medium ink and dark ink is chosen to be 2:3:4 so as to correspond to the resolution. The distance between the adjacent nozzles provided on the recording head for the light ink is arranged to be twice that for the dark ink. The distance between the adjacent nozzles provided on the recording head for the medium ink is arranged to be 1.5 time that for the dark ink. As a result of the above-described structure, the resolution in the sub-scanning direction can be determined.

The control of the resolution in the main scanning direction is performed by controlling the timing of an ink discharge instruction signal (an operation signal) to be supplied to each of the recording heads. Assuming that the carriage 7 moves at a constant speed, it is arranged that the number of the operation signals to be supplied to the medium ink recording head per unit time is 3f, that supplied to the dark ink recording head per unit time is 4f when the number of the operation signals to be supplied to the light ink recording head per unit time is 2f. The carriage according to the first embodiment of the present invention has 8 cartridges as shown in FIG. 6.

Figure 7:
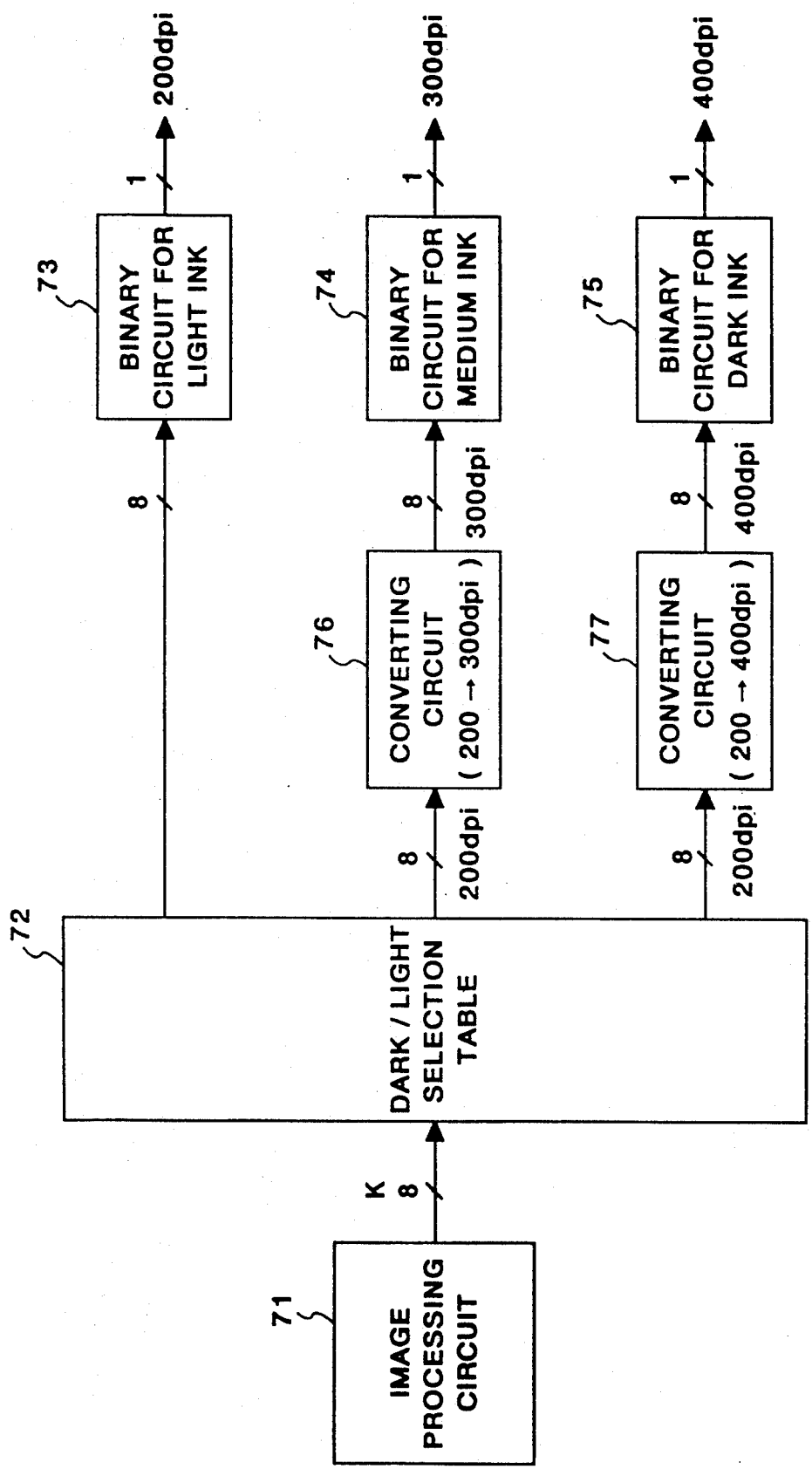
FIG. 7 is a block diagram which illustrates an image processing portion according to the third embodiment of the present invention.

An example of the structure of the image processing circuit for the apparatus according to the third embodiment is shown in FIG. 7.

Referring to the drawing, reference numeral 71 represents a circuit to be subjected to the same processing as those subjected to the image processing circuit 41 shown in FIG. 4. Reference numeral 72 represents a dark/medium/light separation table which receives input data for K (8 bits) and generates data (8 bits) for dark, medium and light inks. The data for K supplied through the image processing circuit 71 according to the third embodiment of the present invention displays a resolution of 200 dpi.

Data for light ink separated by the dark/medium/light separation table 72 is, processed by a light ink binary circuit 73 in which it is converted into an on/off signal with which light ink can be applied. That is, it is outputted to the light ink binary circuit 73 while maintaining the same resolution as that at the time of the input.

Data for medium ink is converted from data for a resolution of 200 dpi to data for a resolution of 300 dpi by a conversion circuit 76 so as to be processed by a medium ink binary circuit 74.

Data for dark ink is converted from data for a resolution of 200 dpi to data for a resolution of 400 dpi by a conversion circuit 77 so as to be processed by a medium ink binary circuit 75.

The above-described conversion circuits 76 and 77 are constituted by compensating circuits for performing a compensating process by using the adjacent pixel data items. Assuming that image data (pixel data) to be supplied to a time series is A, B, C, D,.., the conversion circuit 76 outputs data in a sequential order as A, (A + B)/2, B, C, (C +D)/2, D, . . . , while the conversion circuit 77 outputs data in a sequential order as A, (A+B)/2, B, (B+C)/2, C, (C+D)/2, D, . . . The ratio of the compensation, that is the ratio between the number of the output pixels and the number of the input pixels is made coincident with the ratio between the resolution. That is, when an image of 200 dpi is received and an image of 300 dpi is outputted, the total number of the output pixels in the lateral direction is arranged to be 1.5 times the total number of the input pixels. The vertical pixels are subjected to a similar processing. Since the conversion circuits 76 and 77 also compensate in the sub-scanning direction, each of the conversion circuits 76 and 77 includes a line memory having a proper capacity.

Figure 9:
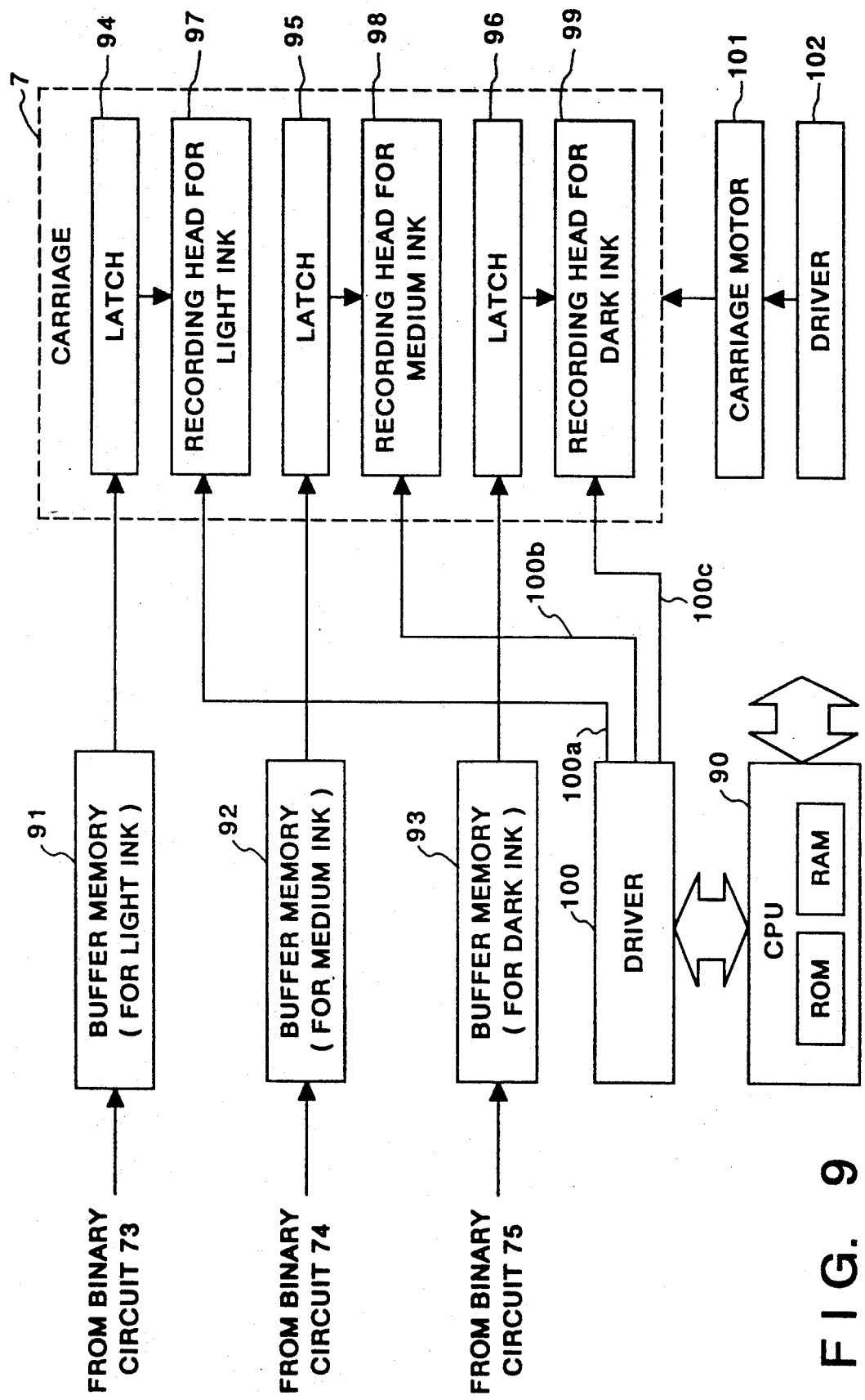
FIG. 9 is a block diagram which illustrates the printing portion for recording the image.

FIG. 9 illustrates an example of an imaging circuit positioned behind the binary circuits 73 to 75 according to this embodiment.

Referring to the drawing, reference numerals 91 to 93 represent buffer memories for temporarily storing image data supplied from the binary circuits 73 to 75. Reference numerals 94 to 96 represent latches for holding binary information to be recorded in accordance with an operation signal. Reference numeral 100 represents a driver for outputting the operation signal to signal lines 100a, 100b and 100c at the above-described timing.

Figure 10A:
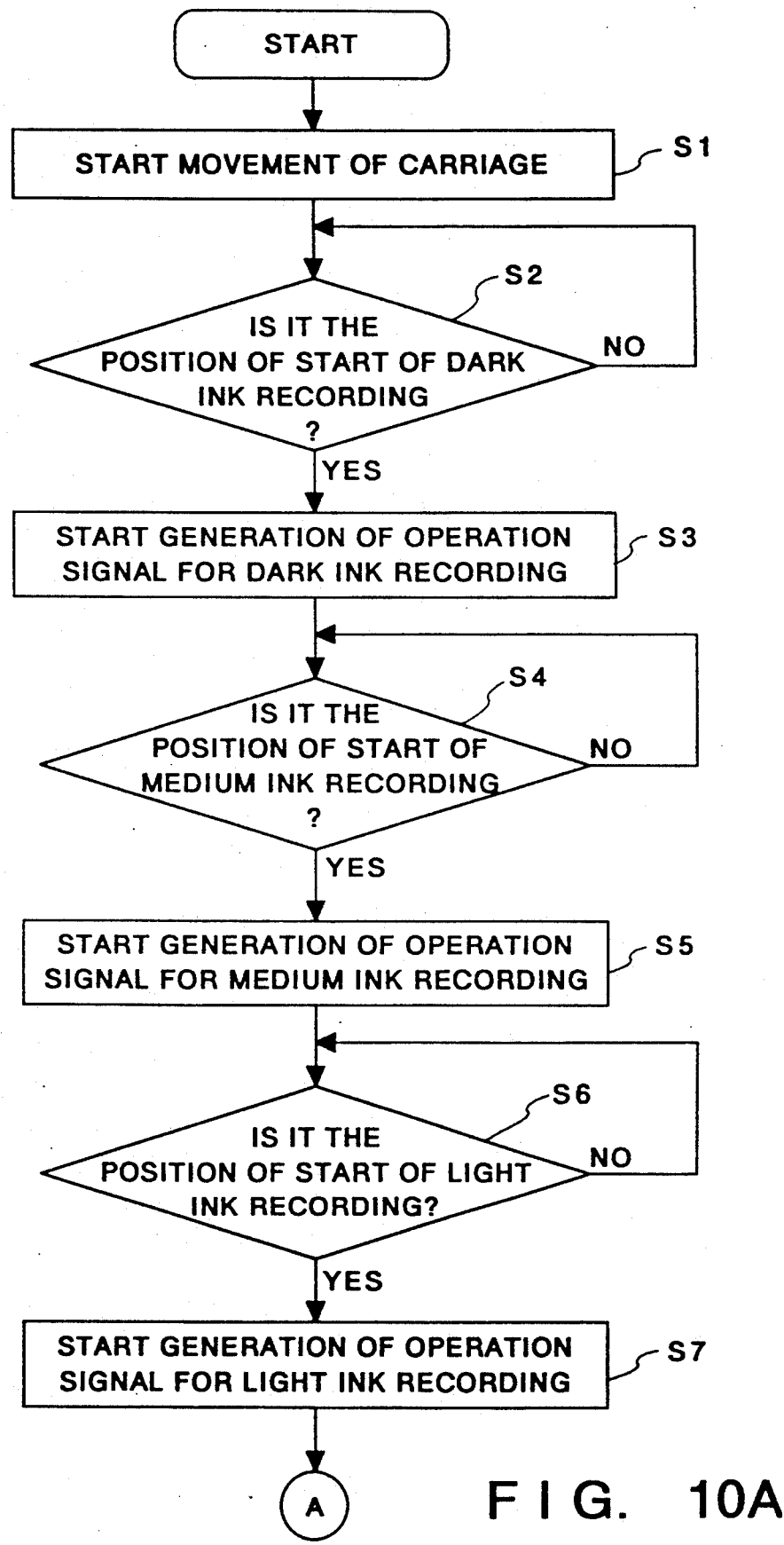
FIGS. 10A and 10B are flow charts for illustrating the operation of the CPU shown in FIG. 9.
Figure 10B:
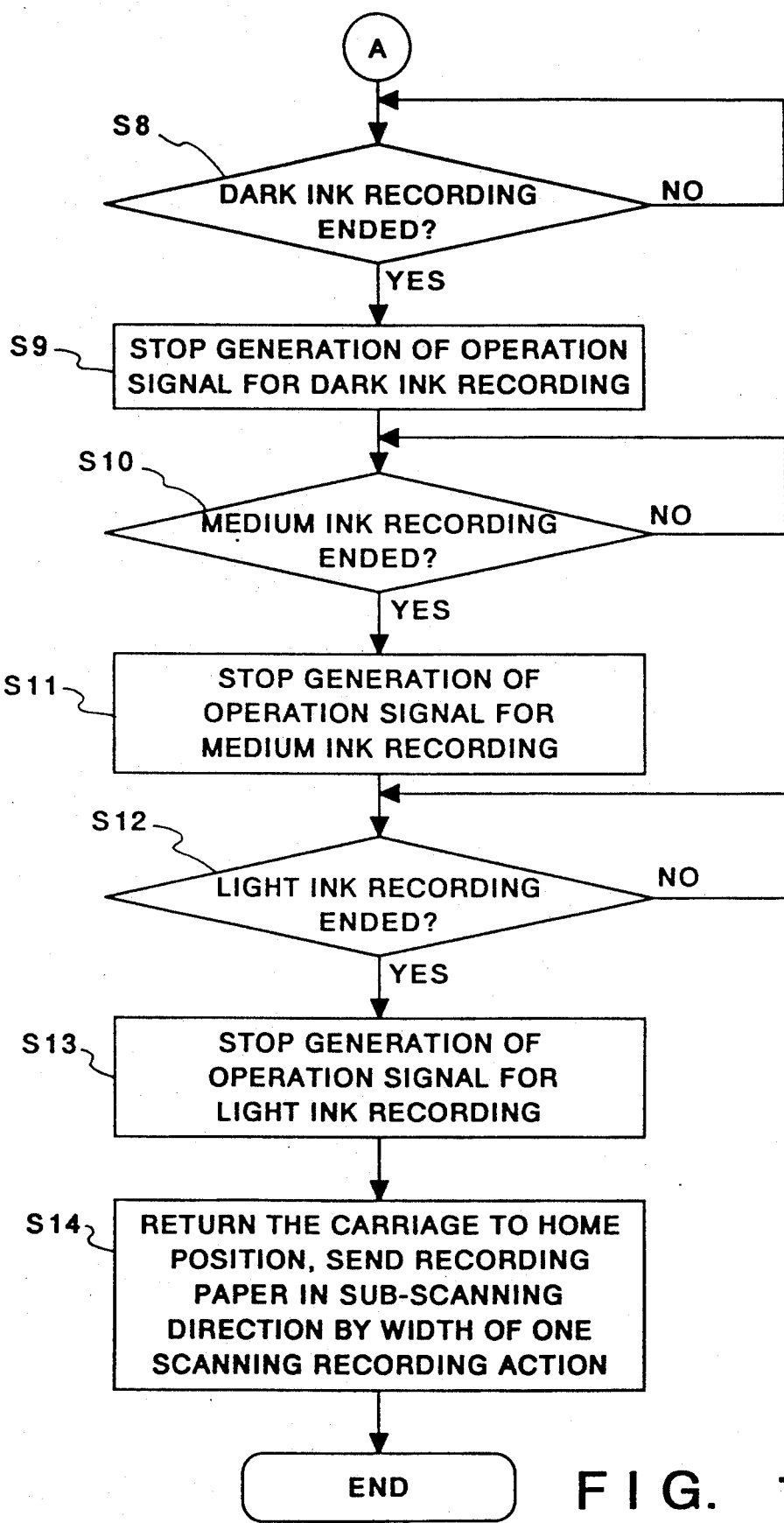

The operation wherein when the carriage 7 performs one scanning action will now be described with reference to a flow chart shown in FIG. 10.

When a CPU 90 detects that an image for one scanning operation of the carriage 7 has been stored in each of the buffer memories 91 to 93, the CPU 90 causes the driver 102 to move the carriage 7. In step S2, it is determined whether or not a dark ink recording head 99 of the carriage 7 has reached a position at which the recording starts. The above-described determination is made by determining whether or not a sensor fixed to the printing portion has detected a specific portion of the carriage 7. It may, of course, be made by another means. If it is determined that the carriage 7 has been moved to the dark ink image recording start position, the CPU 90 instructs the driver 100 to start generation of the operation signals to be supplied to the dark ink recording head 99 via the signal line 100c. When the level of the signal line 100c has become active, the dark ink recording head 99 performs one action of discharging ink in accordance with information latched by the latch 96. Whenever the above-described operation has been completed, next image data is arranged to be read by the latch 9 from the buffer memory 93.

In steps S4 to S7, the CPU 90 controls the start of the medium ink recording. The reason that the recording start time is different for the various types of ink is because the recording heads are disposed at predetermined intervals.

Thus, the carriage 7 gradually moves while performing the scanning operation. As a result, the dark ink recording head 99 first reaches the recording end position. The determination when the recording head 99 reaches the recording end position is made in step S8. If the determination in step S8 is yes, the flow advances to step S9 in which the generation of the operation signal for the dark ink recording is stopped. Then, in steps S10 to S13, similar operations are conducted for the medium and the light ink recording heads. In step S14, the carriage 7 is then moved in the reversed direction so as to reach its home position and recording paper 1 is fed in the scanning direction by a distance corresponding to the one scanning recording action.

As described above, the recording heads 97 to 99 are positioned away from one another. In order to adjust the time delay due to the above-described positions, reading of data from each of the buffer memories with respect to one scanning recording is arranged to be delayed before being latched by each of the latches.

Although the operation signals supplied to the recording heads are generated in the driver 100 according to the above-described embodiments, the operation signals may be arranged to be output from the CPU 90. The reason for this lies in that a number of predetermined clock signals may be counted so as to generate the operation signals.

Figure 8:
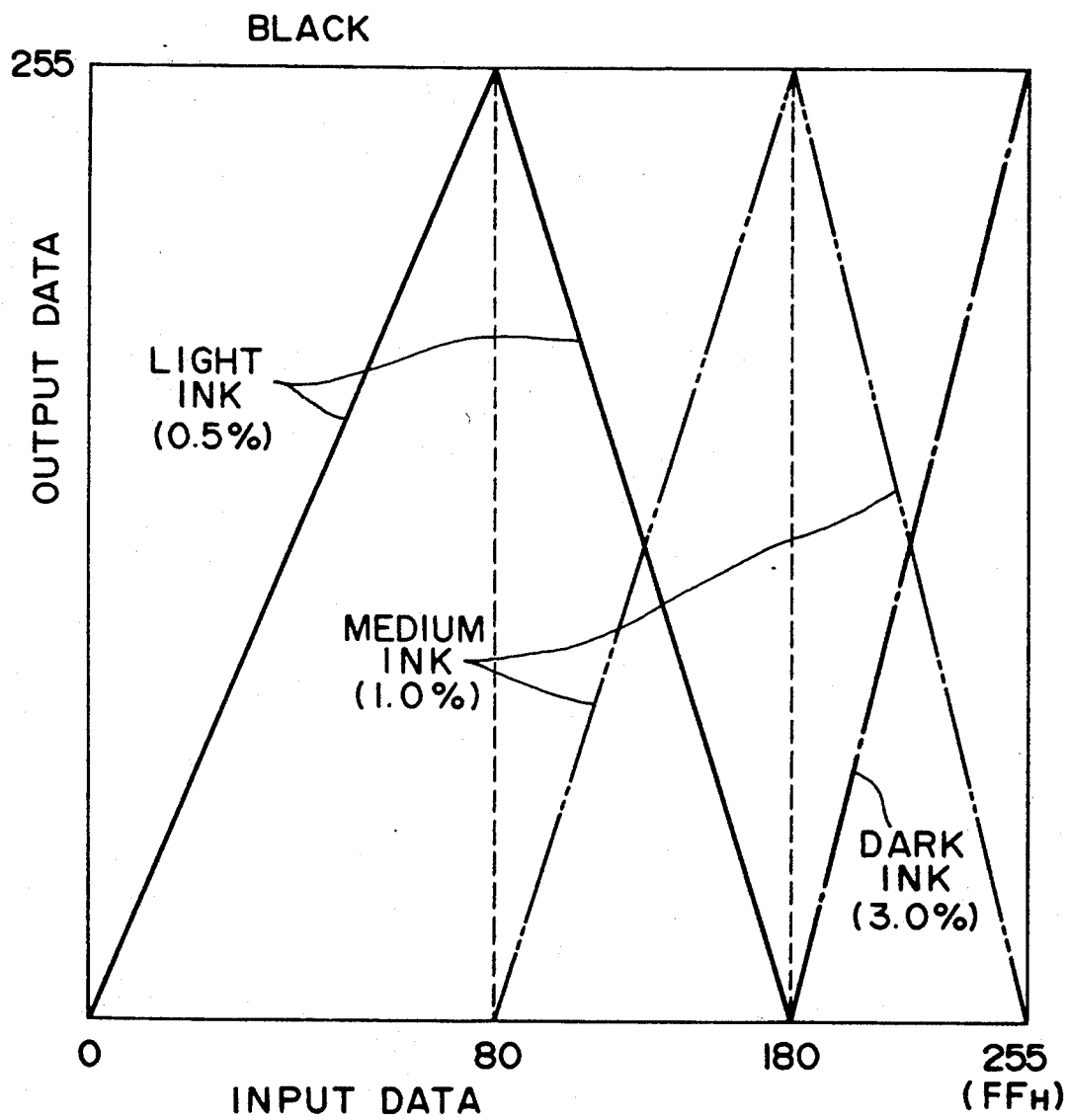
FIG. 8 illustrates the conversion characteristics of a dark/light separation table according to the third embodiment of the present invention.

Conversion characteristics of the dark/medium/light separation table 72 according to the third embodiment of the present invention are shown in FIG. 8.

As shown in FIG. 8, when the value of the input 8-bit data is in a range between 0 and 80, data for both the medium ink and the dark ink are made "0" to which light ink data 0 to 255 are made to correspond. The range in which input data is between 80 and 180 is assigned to light ink and medium ink, while dark ink is made to correspond to "0". A range exceeding 180 is assigned to medium ink and dark ink, while light ink is made "0".

As a result, a portion of an image in which a multiplicity of solid black sections are present, for example, characters or the like, can be expressed with excellent resolution. Furthermore, a highlight portion an image exhibiting an excellent gradient and without granular appearance can be obtained. The above-described binary circuits 73 to 75 are arranged based on the dither method.

Although the structure of the printing portion recording to the first and the second embodiments is not described in great detail, it can be considered to be substantially the same as that according to the third embodiment of the present invention shown in FIG. 9 except for the number of the recording heads. According to the first and the second embodiments, since the difference in the resolution is expressed by means of the binary processing, a structure can be employed in which the nozzles for each of the recording heads are disposed at the same intervals. The difference between these and the third embodiment lies in that the operation signals are supplied to the recording heads at the same intervals.

Other embodiments of the present invention will now be described.

According to the above-described three embodiments, the description is made on the assumption that the ink discharging nozzles for the recording head have the same inner diameter (the diameter of the orifice). However, a structure may be employed in which orifices of 30 $\mu\phi$ for dark ink and those of 40 $\mu\phi$ for other ink are used. In order to express the dark and light images by employing the same orifice diameter, the warmtone of the heads is changed. That is, the warmtone is arranged to be low for the dark image, while the same is arranged to be high for the light image so as to change the diameter of the droplets (the diameter of the droplets are, of course, made to be small for the dark image and large for the light image). As an alternative to the two types of dark and light ink, three or more density ink and recording heads may be employed. However, it is preferable in this case that the highest dye density be made to correspond to the greatest resolution by using the separation table. The above-described method can be widely applied to general methods such as changing the head recording density and the changing by means of a pseudo gradient. The dark and light inks are not necessary for all of the color components and they may be adjusted so as to meet the desired image. Furthermore, assuming that in dark/light integrated cartridge is used, it is preferable that the shape of the cartridge be designed suitably. The present invention is effective not only for color image reproduction but also for monochrome image reproduction.

Although the foregoing description is made with regard to an ink jet printer, and more particularly is made about a bubble jet printer, the present invention may be applied to another type of piezoelectric type printer. Furthermore, it may be applied to a printer capable of forming dots of two or more densities.

As described above, according to the present invention, an excellent quality image exhibiting excellent resolution and gradient without granular appearance in the highlight portions can be obtained.

Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

What is claimed is:

1. An image recording method for recording a gradient image by combining dots of different density, comprising the step of:

performing recording by a first recording means for forming high density dots of a color, the first recording means having a first resolution, and by a second recording means for forming low density dots of the color, the second recording means having a second resolution, wherein the first resolution and the second resolution are different.

2. An image recording method according to claim 1, wherein the first resolution is higher than the second resolution.

3. An image recording method according to claim 1, wherein the first or the second recording means further comprises converting means for converting a resolution of input image data.

4. An image recording method for recording a gradient image by combining dots of different density, comprising the steps of:

receiving an image data having a value;
    generating a first data corresponding to dots of a high density of a color and a second data corresponding to dots of a low density of the color in accordance with the value of the received image data; and
    converting at least one of the first data and the second data so as to have a different resolution from each 5. An image recording method according to claim 4, wherein each of the steps is provided for recording color components.

6. An image recording method for recording a gradient image by combining dots of different density, comprising the steps of:

performing a first half-tone processing for low density dots by using a first half-tone processing algorithm;
    performing a second half-tone processing for high density dots by using a second half-tone processing algorithm different from the first half-tone processing algorithm; and
    outputting the results of the first and second half-tone processings.

7. An image recording method according to claim 6, wherein a resolution for the high density dots is raised with respect to a resolution for the low density dots.

8. An image recording method according to claim 6, wherein the first half-tone processing algorithm uses a dot type dither matrix, and the second half-tone processing algorithm uses a Bayer type dither matrix.

9. An image recording method according to claim 6, wherein the first half-tone processing algorithm is a density pattern method, and the second half-tone processing algorithm is an error diffusion method.

10. An image recording apparatus for recording a gradient image by combining dots of different density, comprising:

receiving means for receiving an image data having a value;

generating means for generating a first data corresponding to dots of a high density of a color and a second data corresponding to dots of a low density of the color in accordance with the value of the image data received by the receiving means; and conversion means for converting at least one of the first data and the second data so as to have a different resolution from each other.

11. An image recording apparatus for recording a gradient image by combining dots of different density, comprising:

receiving means for receiving an image data having a value;

generating means for generating a first data corresponding to dots of a high density of a color and a second data corresponding to dots of a low density of the color in accordance with the value of the image data received by the receiving means; and conversion means for converting at least one of the first data and at least one of the second data so as to have a different resolution from each other, said conversion means further comprising first binary means for binarizing data of the first data generated by the generating means which corresponds to the high density dots so as to raise its resolution and second binary means for binarizing data of the second data generated by the generating means which corresponds to the low density dots so as to raise its gradient.

12. An image recording apparatus according to claim 11, wherein the first binary means employs a Bayer dither matrix, while the second binary means employs a half tone dither matrix.

13. An image recording apparatus according to claim 11, wherein the first binary means employs an error diffusion method, while the second binary means employs a density pattern method.

14. An image recording apparatus according to claim 11, wherein the receiving means, the generating means and the conversion means are respectively provided for components of a color image to be recorded.

15. An image recording apparatus for recording a gradient image by combining dots of different density, comprising:

receiving means for receiving an image data having a value;

generating means for generating a first data corresponding to dots of a high density of a color and a second data corresponding to dots of a low density of the color in accordance with the value of the image data received by the receiving means;

interpolation means for interpolating at least one of the first data and at least one of the second data so as to have a different resolution from each other;

recording means for recording the image in accordance with the resolutions for each of the densities; and control means for controlling in such a manner that data which corresponds to the dots of the high density and the dots of the low density interpolated by the interpolating means is recorded by the recording means.

16. An image recording apparatus according to claim 15, wherein the interpolation means interpolates data for the dots of each density generated in the generating means in accordance with each resolution.

17. An image recording apparatus according to claim 15, wherein the recording means records the high density dots with high resolution and records the low density dots with low resolution.

18. An image recording apparatus according to claim 15, wherein the recording means comprises recording heads whose number corresponding to a number of types of ink having different densities and each of the recording heads has nozzles for discharging ink and is disposed at intervals which correspond to their resolution.

19. An image recording apparatus for recording a gradient image by combining dots of at least two different densities, comprising:

receiving means for receiving an image data having a value;

first data generating means for generating an image data for a dark ink in accordance with the value of the image data received by the receiving means;

second data generating means for generating an image data for a light ink in accordance with the value of the image data received by the receiving means;

first conversion means for converting the image data for the dark ink generated by the first data generating means into a binary signal with a high resolution;

second conversion means for converting the image data for the light ink generated by the second data generating means into a binary signal with a low resolution; and recording means for controlling a discharge of the ink of each density in accordance with the binary signal converted by the first and the second conversion means and recording the image.

20. An image recording apparatus according to claim 19, wherein the image data for the dark ink generated by the first data generating means is generated when the density of the received image data by the receiving means exceeds a predetermined density value, the image data for the dark ink being generated in proportion to the density of the received image data.

21. An image recording apparatus according to claim 19, wherein the image data for the light ink is generated by the second data generating means in proportion to the density of the received image data when the density of the received image data is lower than a predetermined density level, while the data for light ink is generated in inverse proportion to the density of the received image data when the density of the received image data exceeds a predetermined level.

22. An image recording apparatus according to claim 19, wherein the first conversion means employs a Bayer dither matrix, while the second conversion mans employs a half tone dither matrix.

23. An image recording apparatus according to claim 19, wherein the first conversion means is binary conversion mans based upon an error diffusion method, while the second conversion means is binary conversion means based on a density pattern method.

24. An image recording apparatus according to claim 19, wherein the receiving means, the data generating means and the conversion means are respectively provided for components of a color image to be recorded.

25. An image recording apparatus for recording a gradient image by combining dots of different density, comprising:
   first recording means for forming high density dots of a predetermined color; and
   second recording means for forming low density dots of the predetermined color;
   wherein a resolution of the first recording means and a resolution of the second recording means are different from each other.

26. An image recording apparatus according to claim 25, wherein the resolution of the first recording means is higher than that of the second recording means.

27. An image recording apparatus according to claim 25, wherein the first or the second recording means further comprises converting means for converting a resolution of input image data.

* * * * *

UNITED STATES PATENT AND TRADEMARK OFFICE
CERTIFICATE OF CORRECTION

PATENT NO. : 5,142,374
DATED : August 25, 1992
INVENTOR(S) : HIROSHI TAJIKA, ET AL.

It is certified that error appears in the above-identified patent and that said Letters Patent is hereby corrected as shown below:

COLUMN 1

Line 41, "quintriple" should read --quintuple--.

COLUMN 2

Line 21, "densities" should read --densities,--.
Line 47, "images" should read --image-- and "image" should read --images--.

COLUMN 4

Line 46, "structure (4x4)=2" should read --structure (4x4)x2--.
Line 53, "half tone" should read --half-tone--.
Line 54, "half tone" should read --half-tone--.

COLUMN 5

Line 9, "batches" should read --patches--.
Line 23, "manner" should read --manner similar--.
Line 48, "color ink" should read --color inks--.
Line 67, "half" should read --half- --.

COLUMN 6

Line 36, "Then, a" should read --A--.

COLUMN 7

Line 4, "1.5 time" should read --1.5 times--.
Line 35, "is," should read --is--.

UNITED STATES PATENT AND TRADEMARK OFFICE
CERTIFICATE OF CORRECTION

PATENT NO. : 5,142,374
DATED : August 25, 1992
INVENTOR(S) : HIROSHI TAJIKA, ET AL.

It is certified that error appears in the above-identified patent and that said Letters Patent is hereby corrected as shown below:

COLUMN 8

Line 38, "latch 9" should read --latch 96--.
    Line 49, "yes," should read --YES,--.
    Line 54, "reversed" should read --reverse--.

COLUMN 9

Line 23, "re-" should read --ac- --.
    Line 64, "in" should read --a--.

COLUMN 10

Line 12, "particularly," should read --particularity,--.
    Line 46, "each" should read --each other.--.

COLUMN 11

Line 15, "conversion" should read --¶ conversion--.
    Line 42, "half tone" should read --half-tone--.

COLUMN 12

Line 14, "corresponding" should read --corresponds--.
    Line 62, "mans" should read --means--.
    Line 63, "half tone" should read --half-tone--.

UNITED STATES PATENT AND TRADEMARK OFFICE
CERTIFICATE OF CORRECTION

PATENT NO.  : 5,142,374

DATED       : August 25, 1992

INVENTOR(S) : HIROSHI TAJIKA, ET AL.

It is certified that error appears in the above-identified patent and that said Letters Patent is hereby corrected as shown below:

<u>COLUMN 12</u>

Line 66, "mans" should read --means--.

Signed and Sealed this

Twelfth Day of October, 1993

Attest:

BRUCE LEHMAN

Attesting Officer     Commissioner of Patents and Trademarks